United States Patent
Lee et al.

(10) Patent No.: US 10,590,248 B2
(45) Date of Patent: Mar. 17, 2020

(54) PDMS-POLYURETHANE FILM FOR DISPLAYS, AND METHOD FOR PRODUCING SAME

(71) Applicant: LG Chem, Ltd., Seoul (KR)

(72) Inventors: Jong-Won Lee, Daejeon (KR); Hyeon Choi, Daejeon (KR); Houng-Sik Yoo, Daejeon (KR)

(73) Assignee: LG Chem, Ltd. (KR)

( * ) Notice: Subject to any disclaimer, the term of this patent is extended or adjusted under 35 U.S.C. 154(b) by 154 days.

(21) Appl. No.: 15/738,970

(22) PCT Filed: Sep. 22, 2016

(86) PCT No.: PCT/KR2016/010597
§ 371 (c)(1),
(2) Date: Dec. 21, 2017

(87) PCT Pub. No.: WO2017/052235
PCT Pub. Date: Mar. 30, 2017

(65) Prior Publication Data
US 2018/0179350 A1    Jun. 28, 2018

(30) Foreign Application Priority Data
Sep. 25, 2015 (KR) .................. 10-2015-0136867

(51) Int. Cl.
*C08G 18/61* (2006.01)
*C08G 18/73* (2006.01)
(Continued)

(52) U.S. Cl.
CPC .............. *C08J 5/18* (2013.01); *C08G 18/61* (2013.01); *C08G 18/73* (2013.01); *C08G 18/7837* (2013.01); *C08G 18/792* (2013.01); *C08L 83/04* (2013.01); *C09D 183/10* (2013.01); *G06F 1/1637* (2013.01); *G06F 1/1643* (2013.01);
(Continued)

(58) Field of Classification Search
None
See application file for complete search history.

(56) References Cited

U.S. PATENT DOCUMENTS

| 2006/0132922 A1 | 6/2006 | Takao et al. |
| 2011/0198852 A1 | 8/2011 | Jenninger et al. |

(Continued)

FOREIGN PATENT DOCUMENTS

| CN | 102816430 B | * 2/2014 |
| JP | 2012506925 A | 3/2012 |

(Continued)

OTHER PUBLICATIONS

Preparation and Propertied of UV-Curable Poly(dimethylsiloxane) Urethane Acrylate. II. Property-Structure—Molecular Weight Relationships, Journal of Applied Polymer Science, vol. 36, 1889-1907 (1988) to Chiang et al. (Year: 1988).*

(Continued)

*Primary Examiner* — Peter A Salamon
(74) *Attorney, Agent, or Firm* — Lerner, David, Littenberg, Krumholz & Mentlik, LLP

(57) ABSTRACT

The present invention relates to a PDMS-polyurethane film for displays, which has a dielectric constant/elastic modulus value of 2 to 15 mm²/N, and a production method thereof.

7 Claims, 1 Drawing Sheet

$$S_z = \frac{\varepsilon_r \varepsilon_0 (V/z)^2}{Y}$$

$S_z$ = strain
$\varepsilon_r$ = dielectric constant
$V$ = voltage
$Y$ = Elastic Modulus

(51) Int. Cl.
*G06F 3/041* (2006.01)
*C08L 83/04* (2006.01)
*C08J 5/18* (2006.01)
*G06F 3/01* (2006.01)
*C08G 18/79* (2006.01)
*G06F 1/16* (2006.01)
*C08G 18/78* (2006.01)
*C09D 183/10* (2006.01)
*C08G 77/458* (2006.01)

(52) U.S. Cl.
CPC ............... *G06F 3/01* (2013.01); *G06F 3/016* (2013.01); *G06F 3/041* (2013.01); *G06F 3/0416* (2013.01); *C08G 77/458* (2013.01); *C08J 2375/04* (2013.01); *C08J 2383/10* (2013.01); *G06F 2203/04103* (2013.01); *G06F 2203/04107* (2013.01)

(56) References Cited

U.S. PATENT DOCUMENTS

| | | | |
|---|---|---|---|
| 2013/0209699 A1* | 8/2013 | Chen | D06M 15/564 427/513 |
| 2015/0169118 A1 | 6/2015 | Lee et al. | |
| 2015/0321908 A1 | 11/2015 | Wagner et al. | |
| 2016/0218275 A1 | 7/2016 | Wagner et al. | |
| 2018/0179350 A1* | 6/2018 | Lee | G06F 1/1637 |

FOREIGN PATENT DOCUMENTS

| | | | |
|---|---|---|---|
| JP | 2012251030 A | 12/2012 | |
| JP | 2013541310 A | 11/2013 | |
| JP | 2013249460 A | 12/2013 | |
| JP | 2015115078 A | 6/2015 | |
| KR | 20110014950 A | 2/2011 | |
| KR | 20150023462 A | 3/2015 | |
| KR | 20150069410 A | 6/2015 | |
| WO | 2014001272 A1 | 1/2014 | |

OTHER PUBLICATIONS

Search report from International Application No. PCT/KR2016/010597, dated Feb. 10, 2017.

Search report from International Application No. PCT/KR2016/010598, dated Feb. 10, 2017.

* cited by examiner

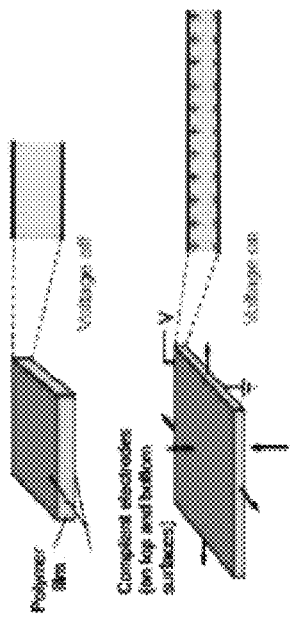

PDMS-POLYURETHANE FILM FOR DISPLAYS, AND METHOD FOR PRODUCING SAME

CROSS-REFERENCE TO RELATED APPLICATIONS

The present application is a national phase entry under 35 U.S.C. § 371 of International Application No. PCT/KR2016/010597, filed on Sep. 22, 2016, which claims priority to and the benefit of Korean Patent Application No. 10-2015-0136867 filed in the Korean Intellectual Property Office on Sep. 25, 2015, the disclosures of which are incorporated herein by reference.

TECHNICAL FIELD

The present invention relates to a PDMS-polyurethane film for displays and a production method thereof, and more particularly, to a PDMS-polyurethane film for displays, which has high dielectric constant and low modulus characteristics, and a production method thereof.

BACKGROUND ART

For an intuitive use of a display by a user, a display to which a touch screen technology is applied has been widely used, and recently, not only a touch screen which is operated by simply touching a screen, but also a haptic function which imparts a haptic feedback to a touch screen to provide a user with a new user's experience have been developed. Here, haptic is a technology that makes a user feel the sense of touch, force, movement, and the like.

In general, the haptic technology may be implemented by converting electrical signals into mechanical energy such as vibration in a display capable of being touch-input, so that a transparent haptic film having excellent electroactivity is required to be developed.

As a material for the film having electroactivity, various electroactive polymers may be used. Examples of the electroactive polymers include a polymer such as PVDF, which uses a piezoelectric system by using a change in volume through the phase transition by voltage, or a polymer such as urethane, which uses a dielectric system in which a dielectric material shrinks and expands in a vertical direction when the dielectric material is charged.

The haptic display film is for a display, and thus basically needs to have excellent permeability and haze characteristics, and a PVDF film, which uses the piezoelectric system, has a fundamental characteristic problem in that the problem of haze caused by crystallinity after poling occurs.

Therefore, there is a need for developing a polymer film having excellent dielectric constant, modulus, and optical characteristics by using a dielectric system in which a dielectric material shrinks and expands in a vertical direction when the dielectric material is charged, and for applying the polymer film to a haptic display.

DETAILED DESCRIPTION OF THE INVENTION

Technical Problem

To solve the problems of the related art as described above, an object of the present invention is to provide a PDMS-polyurethane film for displays, which is capable of maximizing electroactivity by improving dielectric constant and modulus characteristics.

Technical Solution

In order to achieve the aforementioned object, the present invention provides a PDMS-polyurethane film for displays, which has a dielectric constant/elastic modulus value of 2 to 15 mm$^2$/N.

Further, the present invention provides a method for producing a PDMS-polyurethane film for displays, which produces a PDMS-polyurethane film having a dielectric constant/elastic modulus value of 2 to 15 mm$^2$/N by mixing a PDMS-based polyol with polyisocyanate.

Advantageous Effects

A PDMS-polyurethane film for displays according to the present invention has advantages in that the haptic performance may be improved by improving dielectric constant and modulus characteristics to maximize electroactivity, and the film has excellent permeability and haze characteristics, and thus may be applied to a display.

BRIEF DESCRIPTION OF DRAWINGS

FIG. 1 is a schematic view illustrating characteristics of a dielectric elastomer of the present invention.

BEST MODE

Hereinafter, a PDMS-polyurethane film for displays according to the present invention will be described in detail.

The present invention uses a PDMS-polyurethane as a material for a film to be used for a display. The PDMS-polyurethane refers to a urethane of which the substituent is substituted with polydimethylsiloxane (PDMS) as in the following Chemical Formula 1, and the case where such a PDMS-polyurethane film is used may have a low dielectric constant as compared to the case where a general polyurethane film is used.

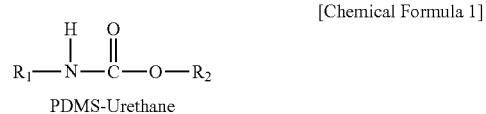

[Chemical Formula 1]

PDMS-Urethane

The PDMS-polyurethane film is a film having characteristics of a dielectric elastomer having both elasticity and dielectricity and may be illustrated as in FIG. 1, and a formula for obtaining a strain of the dielectric elastomer may be represented by the following Equation 1.

$$s_z = -\frac{\varepsilon_r \varepsilon_0 (V/z)^2}{Y}$$ [Equation 1]

$s_z$=Strain
$e_r$=Dielectric Constant
$e_0$=Vacuum Dielectric Constant
V=Voltage
Y=Elastic Modulus The present invention is characterized by improving dielectric constant ($e_r$) and modulus (Y, a ratio of a change in stress/a change in strain; Unit N/mm²) characteristics in order to maximize the electroactivity by adjusting the strain of the aforementioned dielectric elastomer.

As described above, the present invention is to develop a dielectric elastomer having a high dielectric constant and a low modulus, that is, a dielectric elastomer in which a value of e/Y is optimized. In particular, since a urethane resin has a high dielectric constant and a high modulus, the present invention is characterized by obtaining an optimal e/Y value by maximizing an e/Y value of a PDMS-urethane film in which PDMS is applied to urethane as described above in order to lower the modulus.

Accordingly, a PDMS-polyurethane film for displays according to the present invention may have a dielectric constant/elastic modulus value of 2 to 15 mm²/N, more preferably 4 to 12 mm²/N, and most preferably 8 to 12 mm²/N. When the dielectric constant/elastic modulus value is less than 2 mm²/N, there is a problem in that it is difficult to sufficiently implement haptic characteristics, and when the dielectric constant/elastic modulus value is more than 15 mm²/N, there is a problem in that the polyurethane film is easily torn or is stretched too far because the elastic modulus of polyurethane may be too low or the crosslinking density may be low. In contrast, when the dielectric constant/elastic modulus value satisfies 2 to 15 mm²/N, optical characteristics of the PDMS-polyurethane film, such as haze and transmittance, may become excellent, and the PDMS-polyurethane film may have excellent haptic characteristics due to an increase in vibration acceleration.

Further, the PDMS-polyurethane film for displays according to the present invention may have an optical characteristic haze value of 2% or less, more preferably 1% or less. When the optical characteristic haze value is more than 2%, there is a problem in that the PDMS-polyurethane film cannot be used for a display.

Further, the urethane bond number of moles of the PDMS-polyurethane film for displays according to the present invention may be $1.5 \times 10^{-3}$ (mol/g) or more, and more preferably $1.5 \times 10^{-3}$ to $2 \times 10^2$ (mol/g). When the urethane bond number of moles is less than $1.5 \times 10^{-3}$ (mol/g), there is a problem in that the amount of PDMS in the film is relatively increased, and as a result, the dielectric constant value is decreased.

In addition, Si may be included in an amount of 15 wt % to 25 wt % in the PDMS-polyurethane film for displays according to the present invention. When the content of Si is less than 15 wt %, the amount of PDMS included is so low that there is a problem in that the modulus value is decreased, and when the content of Si is more than 25 wt %, the amount of PDMS included is so high that there are problems in that the dielectric constant value may be decreased, and the strength of the film becomes low due to the low crosslinking density, and as a result, the film may be easily torn.

Furthermore, since the PDMS-polyurethane film for displays according to the present invention has a high dielectric constant and a low modulus, and optical characteristics and urethane bond number of moles as described above, the film may be used for a haptic display.

Further, in order to produce the PDMS-polyurethane film for displays, the present invention may produce a PDMS-polyurethane film having a dielectric constant/elastic modulus value of 2 to 15 mm²/N by mixing polyol with polyisocyanate.

The PDMS-polyurethane film for displays may be produced through, for example, the following Reaction Formula 1.

[Reaction Formula 1]

(In Reaction Formula 1, $R_1$—NCO represents a polyisocyanate group, and $R_2$ is polydimethylsiloxane (PDMS).)

The production of the PDMS-polyurethane film for displays according to the present invention has advantages in that as in Reaction Formula 1, various combinations can be made through a urethane reaction of a PDMS-based polyol with polyisocyanate, and a urethane resin having various characteristics may be produced according to the characteristics of a PDMS-based polyol or polyisocyanate.

In the production of the aforementioned PDMS-polyurethane film for displays according to the present invention, the polyol is used to produce a urethane resin, and is not particularly limited as long as the polyol is a PDMS-based polyol substituted with PDMS.

In the production of the aforementioned PDMS-polyurethane film for displays according to the present invention, the polyol may be mixed in an OH equivalent weight of 50 to 300 g/mol. When the OH equivalent weight of the polyol is less than 50 g/mol, there are problems in that the crosslinking density of the film is increased, and the elastic modulus value is increased, and when the OH equivalent weight of the polyol is more than 300 g/mol, there are problems in that the urethane bond number of moles in the film becomes low, so that the dielectric constant value becomes low, and the strength of the film is low due to the low crosslinking density, and as a result, the film is easily torn.

Further, in the production of the PDMS-polyurethane film for displays according to the present invention, the polyisocyanate is not particularly limited as long as the polyisocyanate is used to produce a urethane resin, but preferably, it is possible to use one or more selected from the group consisting of diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), and naphthylene-1,5-isocyanate (NDI).

In the production of the PDMS-polyurethane film for displays according to the present invention, the polyisocyanate may be mixed in an NCO equivalent weight of 200 to 500 g/mol. When the NCO equivalent weight of the polyisocyanate is less than 200 g/mol, there are problems in that the crosslinking density of the film is increased, and the elastic modulus value thereof is increased, and when the NCO equivalent weight of the polyisocyanate is more than 500 g/mol, there are problems in that the urethane bond number of moles in the film becomes low, so that the dielectric constant value becomes low, and the strength of the film is low due to the low crosslinking density, and as a result, the film is easily torn.

A PDMS-polyurethane film for displays produced by the production method according to the present invention may have a dielectric constant/elastic modulus value of 2 to 15 mm$^2$/N, more preferably 4 to 12 mm$^2$/N, and most preferably 8 to 12 mm$^2$/N. When the dielectric constant/elastic modulus value is less than 2 mm$^2$/N, there is a problem in that it is difficult to sufficiently implement haptic characteristics, and when the dielectric constant/elastic modulus value is more than 15 mm$^2$/N, there is a problem in that the polyurethane film is easily torn or is stretched too far because the elastic modulus of polyurethane may be too low or the crosslinking density may be low. In contrast, when the dielectric constant/elastic modulus value satisfies 2 to 15 mm$^2$/N, optical characteristics of the PDMS-polyurethane film, such as haze and transmittance, may become excellent, and the PDMS-polyurethane film may have excellent haptic characteristics due to an increase in vibration acceleration.

Further, the PDMS-polyurethane film for displays produced by the production method according to the present invention may have an optical characteristic haze value of 2% or less, more preferably 1% or less. When the optical characteristic haze value is more than 2%, there is a problem in that the PDMS-polyurethane film cannot be used for a display.

Further, the urethane bond number of moles of the PDMS-polyurethane film for displays produced by the production method according to the present invention may be 1.5×10$^{-3}$ (mol/g) or more, and more preferably 1.5×10$^{-3}$ to 2×10$^2$ (mol/g). When the urethane bond number of moles is less than 1.5×10$^{-3}$ (mol/g), there is a problem in that the amount of PDMS in the film is relatively increased, and as a result, the dielectric constant value is decreased.

Furthermore, since the PDMS-polyurethane film for displays produced by the production method according to the present invention has a high dielectric constant and a low modulus, and optical characteristics and urethane bond number of moles as described above, the film may be used for a haptic display.

In addition, Si may be included in an amount of 15 wt % to 25 wt % in the PDMS-polyurethane film for displays produced by the production method according to the present invention. When the content of Si is less than 15 wt %, the amount of PDMS included is so low that there is a problem in that the modulus value is decreased, and when the content of Si is more than 25 wt %, the amount of PDMS included is so high that there are problems in that the dielectric constant value may be decreased, and the strength of the film becomes low due to the low crosslinking density, and as a result, the film may be easily torn.

Meanwhile, in the method for producing the polyurethane film for displays, the description on the configuration overlapping with that of the polyurethane film for displays previously examined is the same.

MODE FOR INVENTION

Hereinafter, preferred examples will be provided to help understand the present invention, but the following Examples are only provided to illustrate the present invention, and it is apparent to those skilled in the art that various alterations and modifications are possible within the scope and technical spirit of the present invention, and it is natural that such alterations and modifications also fall within the accompanying claims.

Example

Production of Urethane Film

As in the following Table 1, polyol and polyisocyanate were each mixed at the following equivalent weight ratio, and then 0.01% of a catalyst dibutyltin dilaurate (DBTDL) was added thereto, and the resulting mixture was uniformly mixed. Thereafter, the mixture was coated on a glass base material by using a bar coating method, a treatment was performed at 100° C. for 3 hours, and then the coating was separated from the glass to obtain a urethane film having a thickness of 80 μm.

TABLE 1

|  | Polyol | Poly isocyanate | EQUIVALENT WEIGHT (g/mol) | |
|---|---|---|---|---|
|  |  |  | OH (Polyol) | NCO (Polyisocyanate) |
| Example 1 | A-1 | B-1 | 290 | 200 |
| Example 2 | A-2 | B-1 | 470 | 200 |
| Example 3 | A-3 | B-1 | 900 | 200 |
| Comparative Example 1 | A-4 | B-2 | 397.5 | 180 |
| Comparative Example 2 | A-3 | B-2 | 900 | 180 |
| Comparative Example 3 | A-5 | B-2 | 2500 | 180 |

A-1: KF6000 (Shin-Etsu)
A-2: X-22-160AS (Shin-Etsu)
A-3: KF6001 (Shin-Etsu)
A-4: Desmophen_1300BA (Bayer)
A-5: KF6003 (Shin-Etsu)
B-1: Desmodur XP 2580 (Bayer)
B-2: Desmodur N 3900 (Bayer)

Experimental Examples

Measurement of Physical Properties

For the produced urethane film, the dielectric constant, the modulus, the content of Si, the optical characteristics, and the haptic characteristics were measured as described below.

1. Dielectric Constant

Pt was deposited onto both surfaces of a film having an area of 2 cm 2 cm, and then the capacitance was measured at 1 kHz, and a dielectric constant was obtained by using the thickness and the area.

2. Modulus

A modulus value was obtained through the measurement of stress/strain by using a UTM apparatus (a 2010 UTM apparatus manufactured by Zwick Roell Co., Ltd.).

3. Evaluation of Content of Si

The content of Si in the film was measured by using an ICP-OES (Optima 7300DV) equipment manufactured by Perkin Elmer Co., Ltd.

4. Optical Characteristics

Haze and transmittance were measured by using a haze meter COH 400 (manufactured by Nippon Denshoku Co., Ltd.).

5. Haptic Characteristics

In order to measure haptic characteristics, the vibration of the film was defined as a vibration acceleration and measured under a voltage applied onto both surfaces of the film.

An ITO-deposited PET film was attached to both surfaces of a film produced to a thickness of 80 um, a voltage (1.5 kV to −1.5 kV) was applied thereto, and then the vibration of the film at this time was measured by a vibration measuring device.

TABLE 2

|  | Bond density* | Dielectric constant | Modulus (Pa) | e/Y (mm$^2$/N) | Si (wt %) | Optical characteristics | | Vibration acceleration (G) |
| --- | --- | --- | --- | --- | --- | --- | --- | --- |
|  |  |  |  |  |  | Haze (%) | Transmittance (%) |  |
| Example 1 | 1.17*10$^2$ | 7.2 | 0.88 | 8.18 | 15.3 | 0.4 | 93 | 0.190 |
| Example 2 | 1.50*10$^{-3}$ | 6.1 | 0.6 | 10.14 | 19.7 | 0.5 | 92 | 0.210 |
| Example 3 | 9.13*10$^{-4}$ | 4.4 | 0.5 | 8.74 | 24.0 | 0.5 | 93 | 0.195 |
| Comparative Example 1 | 1.73*10$^{-3}$ | 4.0 | 11 | 0.36 | 0 | 5 | 88 | X (No vibration) |
| Comparative Example 2 | 9.26*10$^{-4}$ | 4.5 | 2.9 | 1.56 | 26.8 | 0.4 | 93 | 0.120 |
| Comparative Example 3 | 3.73*10$^{-4}$ | 3.3 | 2.4 | 1.37 | 31.5 | 0.5 | 92 | 0.116 |

*Bond density: Urethane bond number of moles (mol/g)

As shown in Table 2, it could be seen that as the dielectric constant/modulus ratios of the PDMS-polyurethane films in Examples 1 to 3, which were produced according to the present invention, were adjusted to 8 or more, the films could be used for a display due to the excellent optical characteristics of haze and transmittance, and could be used for a haptic display due to the excellent haptic characteristics. In contrast, it could be seen that the polyurethane films in Comparative Examples 1 to 3 were not sufficient for being used as a haptic or display film because the optical characteristics and haptic characteristics thereof deteriorate.

The invention claimed is:

1. A polydimethylsiloxane (PDMS)-polyurethane film for displays, which has a ratio of a dielectric constant to elastic modulus of 2 to 15 mm$^2$/N.

2. The PDMS-polyurethane film of claim 1, wherein the PDMS-polyurethane film has an optical characteristic haze value of 2% or less.

3. The PDMS-polyurethane film of claim 1, wherein a urethane bond number of the PDMS-polyurethane film is 1.5×10$^{-3}$ (mol/g) or more.

4. The PDMS-polyurethane film of claim 1, wherein a content of Si in the PDMS-polyurethane film is 15 wt % to 25 wt %.

5. The PDMS-polyurethane film of claim 1, wherein the PDMS-polyurethane film is used in an elastic transparent film having a high dielectric constant for a haptic display.

6. The PDMS-polyurethane film of claim 1, wherein the PDMS-polyurethane film is prepared by reacting a PDMS-based polyol and a polyisocyanate, wherein the polyisocyanate has an NCO equivalent weight ranging from 200 to 500 g/mol.

7. The PDMS-polyurethane film of claim 1, wherein the elastic modulus ranges from 0.5 N/mm$^2$ to 0.88 N/mm$^2$.

* * * * *